(12) United States Patent
Trantham et al.

(10) Patent No.: US 9,460,741 B1
(45) Date of Patent: Oct. 4, 2016

(54) ADJUSTING TRACK SPACING FOR HEAT ASSISTED RECORDING MEDIUM ACCORDING TO READER TO-READER SEPARATION

(71) Applicant: Seagate Technology LLC, Cupertino, CA (US)

(72) Inventors: Jon D. Trantham, Chanhassen, MN (US); Tim Rausch, Farmington, MN (US); Jason C. Jury, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/862,937

(22) Filed: Sep. 23, 2015

(51) Int. Cl.
*G11B 5/02* (2006.01)
*G11B 5/58* (2006.01)
*G11B 5/012* (2006.01)
*G11B 5/00* (2006.01)
*G11B 20/12* (2006.01)
*G11B 5/39* (2006.01)

(52) U.S. Cl.
CPC .............. *G11B 5/581* (2013.01); *G11B 5/012* (2013.01); *G11B 5/02* (2013.01); *G11B 5/397* (2013.01); *G11B 5/3945* (2013.01); *G11B 2005/0021* (2013.01); *G11B 2020/1292* (2013.01); *G11B 2020/1298* (2013.01)

(58) Field of Classification Search
None
See application file for complete search history.

(56) References Cited

U.S. PATENT DOCUMENTS

| | | | |
|---|---|---|---|
| 8,797,672 B2 | 8/2014 | Tanabe et al. | |
| 8,902,536 B1 | 12/2014 | Hwang et al. | |
| 9,047,879 B2 | 6/2015 | Inch et al. | |
| 2015/0221333 A1* | 8/2015 | Hwang | G11B 20/1217 360/45 |

* cited by examiner

*Primary Examiner* — Brian Butcher
(74) *Attorney, Agent, or Firm* — Hollingsworth Davis, LLC

(57) ABSTRACT

Two or more reader sensors are commonly mounted on a read/write head that is configured to read data from a heat-assisted recording medium. For a region of the recording medium, a separation is determined for the reader sensors. A track spacing that provides a target areal density for the region is determined. The track spacing for the region is adjusted to approach a predetermined ratio of the separation.

20 Claims, 4 Drawing Sheets

ADJUSTING TRACK SPACING FOR HEAT ASSISTED RECORDING MEDIUM ACCORDING TO READER TO-READER SEPARATION

SUMMARY

The present disclosure is related to adjusting track spacing for heat assisted recording medium according to reader to-reader separation. In one embodiment, for a region of a heat-assisted recording medium of a data storage device, a separation is determined between two or more reader sensors commonly mounted on a read/write head used to read the recording medium. A track spacing that provides a target areal density for the region is determined. The track spacing for the region is adjusted to approach a predetermined ratio of the separation.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is related to systems, methods, and apparatuses utilizing magnetic readers with multiple read sensors for reading magnetic recording media, e.g., hard disks. Generally, current hard disk devices utilize a read/write head (also referred to as a slider) with a single read transducer for reading data. Multiple read/write heads are already being used in devices, e.g., separate read/write heads positioned at top and bottom surfaces of one or more magnetic disks. New architectures are being proposed that use more than one read transducer per read/write head. These new architectures may facilitate recording data at an increased areal density compared to current recording architectures (e.g., single read-sensor perpendicular recording).

The theoretical maximum areal density of current magnetic recording architectures is bounded by what is known as the superparamagnetic limit. The superparamagnetic limit relates to the tendency of magnetic grains to randomly flip magnetic orientation in response to thermal fluctuations, and defines a lower bound on the area in which an individual bit can be reliably stored. As a result of this superparamagnetic limit, conventional magnetic recording technology is challenged to improve the areal density.

Technologies such as heat assisted magnetic recording (HAMR) are being developed to increase areal density beyond what is currently possible with perpendicular architectures. A HAMR recording device uses an energy source such as a laser to heat a spot on a high-coercivity medium to locally reduce coercivity during recording. After the spot has cooled, the data is less susceptible to degradation and loss due to thermal fluctuations. The size of the hot spot (rather than the magnetic pole width) defines the size of the recorded bits, and this allows writing of narrower tracks than might be otherwise be possible using a conventional write pole.

When areal density is increased using HAMR, existing read transducers may have difficulty reading back these narrower tracks. For example, shrinking the read transducers in a cross-track direction may decrease signal-to-noise ratio. In the present disclosure, a multiple-sensor magnetic recording (MSMR) scheme is proposed that can take advantage of increased areal density recording techniques. For example, the proposed architecture can read back data that is recording at very small inter-track spacing, which is often expressed in tracks-per-inch (TPI). The MSMR scheme can in some cases be used as part of a two-dimensional magnetic recording (TDMR) scheme, in which data from two or more tracks may be processed at once.

Figure 1:
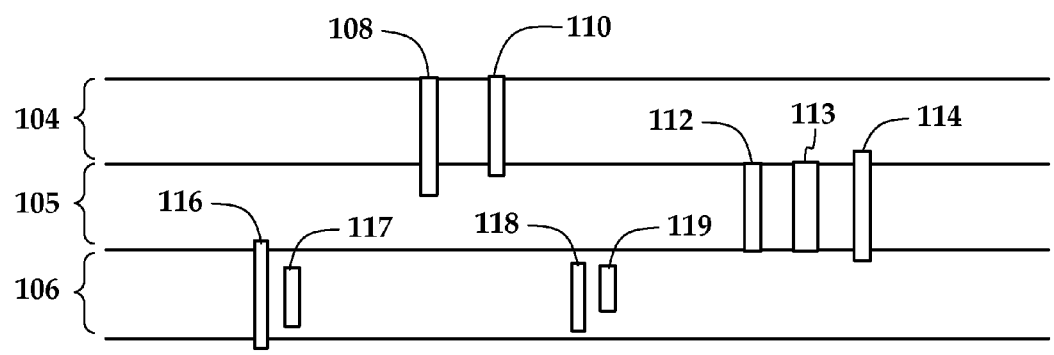
FIG. 1 is a block diagram illustrating reading of data tracks with multiple read sensors according to an example embodiment.

In reference now to FIG. 1, a block diagram illustrates an example of various MSMR reader sensor arrangements according to an example embodiment. Adjacent tracks 104-106 are written on a magnetic media surface 100. Bits within the tracks 104-106 are sensed by read transducers 108 and/or 110. The read transducers 108, 110 are mounted to a common structure (e.g., a slider, read head, etc.) and are generally arranged to read signals from a single track, track 104 in this example. The read transducers 108, 110 are designed with different characteristics apart from their location that provides signal diversity when reading back data stored on the track 104. As will be described in greater detail below, diverse signals from multiple readers can be combined to improve performance under some conditions.

The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the track 104. A number of parameters in the construction and/or operation of the read transducers 108, 110 can be varied to provide signal diversity.

As shown in FIG. 1, the read transducers 108, 110 may differ by cross-track width. The read transducers 108, 110 are also shown with different cross-track alignment relative to the center of the track 104. Transducer 110 is roughly aligned with the center of the track 104, and sensor 108 is not. Another example of diversity is shown by another set of read transducers 112-114 according to an example embodiment, which may be mounted to a common structure such as a slider. All the read transducers 112-114 are aligned to the center of track 105. Read transducer 114 has a larger cross-track width than readers 112, 113, and read transducer 113 has a larger down-track thickness (e.g., shield-to-shield spacing) than read transducers 112, 114. In the latter case, this may result in a different resolution of the read transducer 113 compared to read transducer 112, 114. It will be understood that embodiments described herein may utilize two read transducers that have characteristics of any combination read transducers 112-114.

In the previous examples, the read transducers were larger than or about equal to the track width. As indicated by example commonly-mounted read transducers 116, 117 over track 106, at least one of the read transducers may be smaller than the track width. As indicated by example commonly-mounted read transducers 118, 119 also over track 106, both of the read transducers may be smaller than the track width. The transducers 116, 117 are centrally aligned with each other in the cross-track direction, and 118,119 are offset with respect to one another in the cross-track direction. Any of the read transducers shown in FIG. 1 may be centrally aligned or not with other commonly-mounted read transducers on the same mounting structure.

In MSMR disk drives, the bit-error-rate performance of the reader subsystem is a function of both the reader sensor spacing, reader sensor to track angle, and the width of the written data track. The track width in conventional perpendicular storage systems is largely determined by the geometry of the writer pole tip and its angle with the written track, and can be marginally adjusted by changing the writer current. Over the various skew angles, the effective width of sensor spacing across the stroke (which is defined as the spacing of sensors on a track written with 0 degree skew versus one written with ±5 degrees of head skew) reduces with the cosine of the arm-track angle. Skew angle also deteriorates the sensor element's optimal alignment with magnetic transitions of the written signal. This variation versus skew angle can lead to compromises in sensor spacing (with respect to the written data track) to optimize the overall performance of a MSMR head across the actuator stroke of a disk drive.

Figure 2:
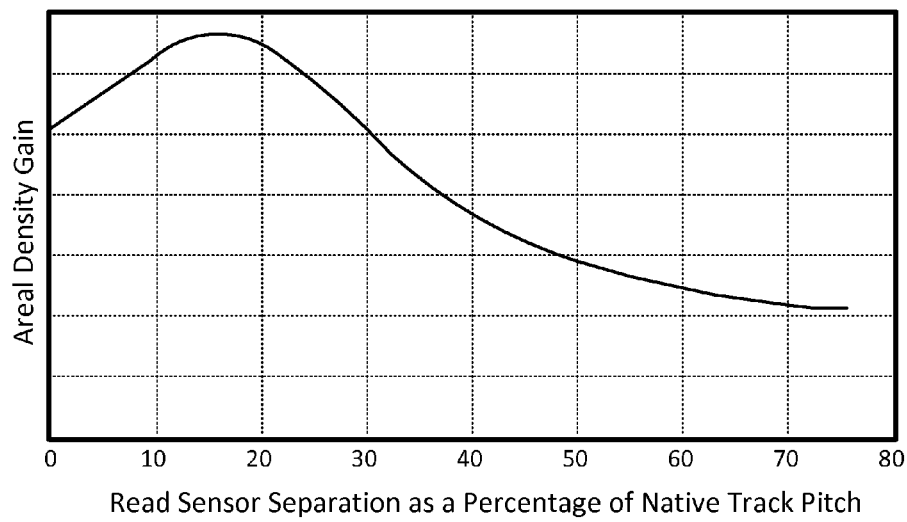
FIG. 2 is a graph of read sensor separation versus areal density gain in a recording head according to an example embodiment.

As seen in the graph of FIG. 2, these effects of read sensor cross-track separation on bit error rate can alter the effective areal density gain in an MSMR head (compared to a single-sensor recording head) according to an example embodiment. In this example, a read transducer separation of about 15% of native track pitch results in the highest gain in areal density. Stated another way, the track pitch can be set to a ratio of about 6.7 of reader separation to obtain the highest areal density in this example. Other ratios may be used, such as between 3 to 10 times reader separation. It will be understood that results may vary depending on a number of factors, but generally this indicates that track pitch and reader separation together can affect the potential areal density. It is noted that the reader sensor separation on a recording head is fixed, however, because the sensors are typically attached to the arm of a rotary actuator the relative sensor separation (as a percentage of a fixed track width) varies across the recording surface.

Figure 3:
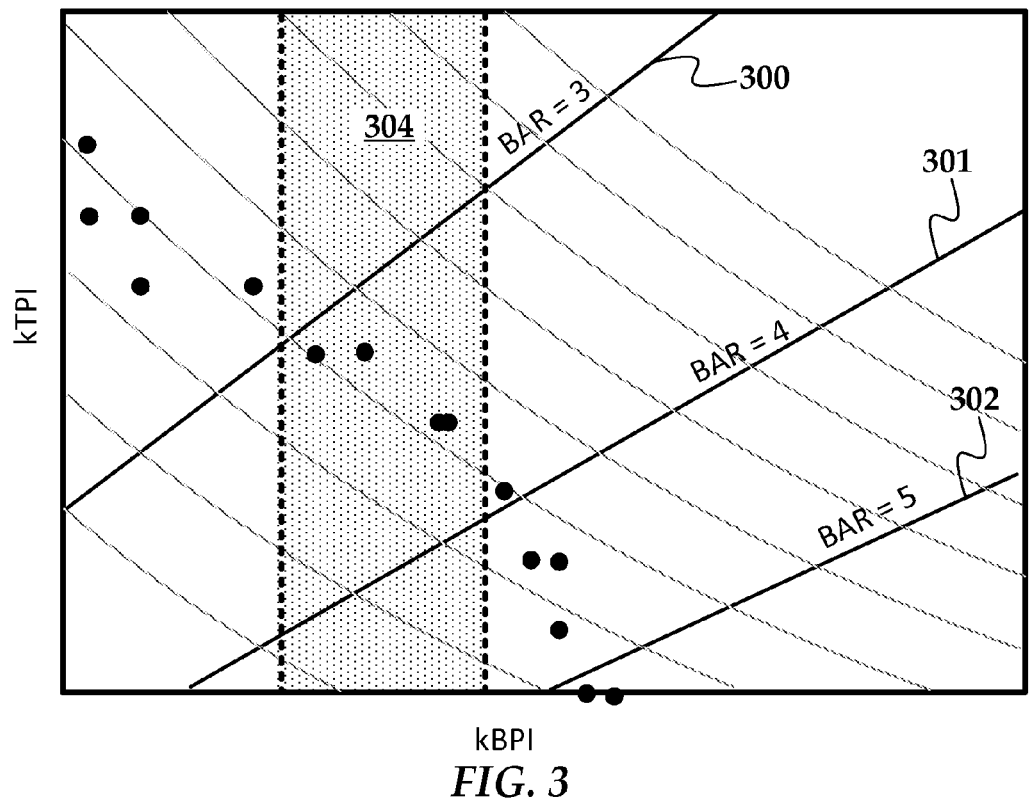
FIG. 3 is a graph of an example range of linear densities and track spacings possible for a recording head according to an example embodiment.

As noted above, an MSMR read/write head may be used together with a HAMR medium. Unlike a conventional perpendicular recording drive, in a HAMR disk drive, the track width is far more adjustable. Although the tip of a near-field transducer of a HAMR recording head is fixed in its width, altering the applied laser power can vary the width of the written track. This is due to the track width being predominately determined by the amount of media being heated above the Curie point. By increasing laser power, tracks may be written wider, and conversely by decreasing laser power they may be written narrower. In FIG. 3, a graph illustrates an example of linear density (also referred to as bit length, and expressed in thousands of bits per inch, or kBPI) and track spacing (expressed as kTPI) for a single HAMR recording head according to an example embodiment. Lines 300-302 represent regions of constant BAR, in this case expressed as BPI/TPI. The curved grey lines represent constant areal density capacity. The different points in the figure are obtained by adjusting laser current for a set of test tracks at the indicated kTPI and kBPI values. For each point, the track spacing was set and then kBPI adjusted to meet a target bit error rate (BER). Notice that areal density in shaded region 304 is relatively flat.

Figure 4:
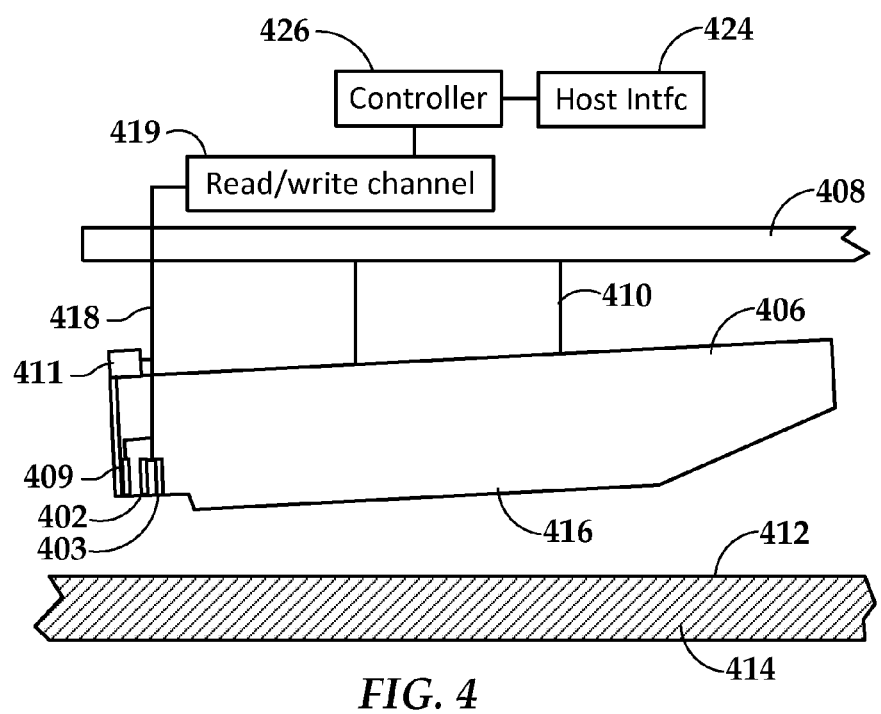
FIG. 4 is a block diagram of a system and apparatus according to an example embodiment.

In view of this, a HAMR MSMR disk drive can be optimized by adjusting laser power as described in methods and apparatuses below. In FIG. 4, a block diagram illustrates an MSMR system according to an example embodiment. Generally, first and second read transducers 402, 403 are housed at a trailing edge of a slider 406, also sometimes referred to as a read/write head, read head, recording head, etc. More than two read transducers may be used in other embodiments. The slider 406 is coupled to arm 408 by way of a suspension 410 that allows some relative motion between the slider 406 and arm 408. In addition to the read transducers 402, 403, the slider 406 may include one or more write transducers 409, such as a write pole, coil, and near-field transducer. A laser diode 411 or other energy source applies heat to a surface 412 of a recording medium 414 (e.g., magnetic disk) when recording.

When reading back data, changes in local magnetic field from the moving disk 414 induce a change in resistance of the read transducers 402, 403. The read transducers are coupled to read/write channel 419 by way of signal lines 418 (which are also shown coupled to write transducer 409 and laser 411). Generally, the read/write channel 419 includes circuitry (e.g., amplifiers, preamplifiers, filters) that amplify and condition the analog signals transmitted via signal lines 418. The amplified signals received via the read/write channel 422 are decoded to produce a digital output from the analog signals, the digital output being used by a host via host interface 424, as well as other system components (not shown). The read/write channel 419 also encodes and sends signals to the laser 411 and write transducer 409 to record data to the recording medium 414. The processing of the signals and data is generally managed by a controller 426, which may include a microprocessor and/or other logic circuits.

Figure 5:
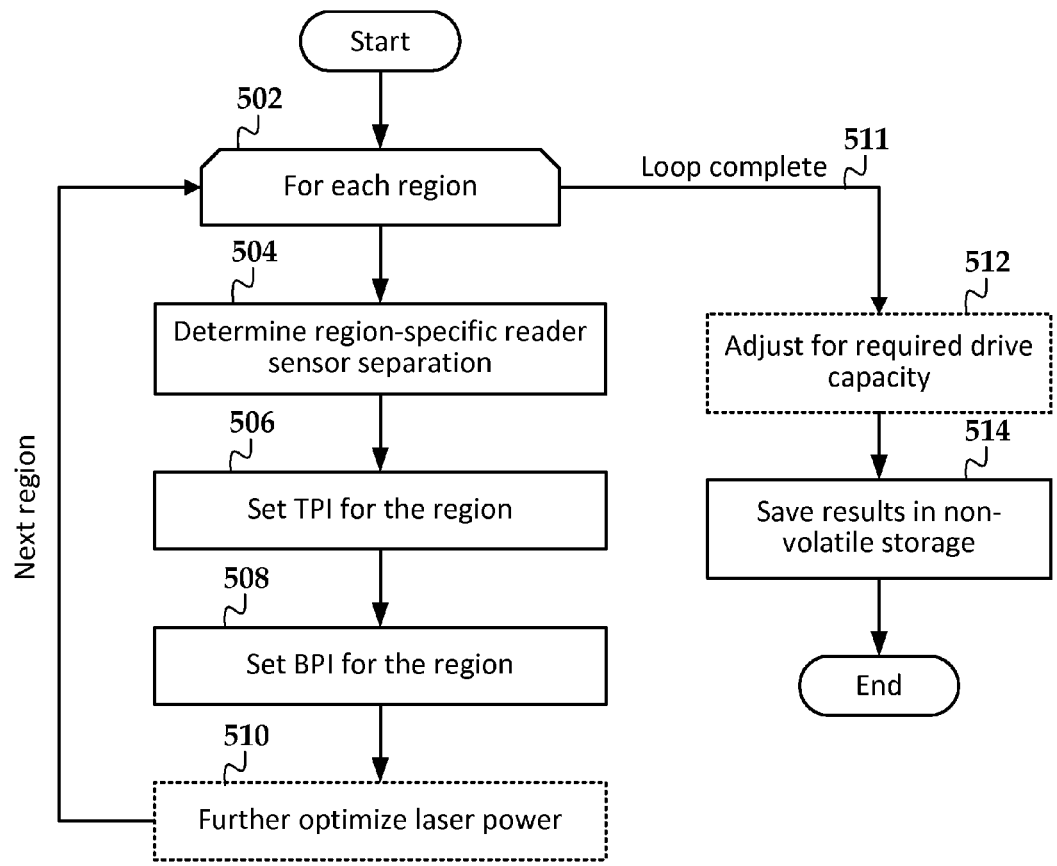
FIGS. 5 and 6 are flowchart illustrating methods according to example embodiments.

Generally, the optimization procedure may be performed directly by controller, e.g., via software or firmware operating directly on the controller 426. In other situations, some or all of the procedure may be performed via an external tester or the like, e.g., via host interface 424 or some other data interface. An example optimization procedure is shown in the flowchart of FIG. 5. For this optimization, it will be assumed that the servo-mechanical system has been characterized, the highest TPI capability has been determined, and the sensor spacing vs. areal density curves are known.

Block 502 represents a loop limit, the loop iterating through a number of regions. The regions may be defined by servo zones, skew angle ranges, etc. For each regions, a region-specific reader sensor separation is determined 504. This determination 504 may be made, for example, by writing a single-tone pattern in an erased portion of the media using the writer of a read/write head. The readers of the read/write head provide a multi-sensor response while be incrementally moved cross-track across the written pattern. The relative timing of the sensor signals provide an indication of downtrack separation between the sensors. The cross track response curves (e.g., signal amplitude as a function of servo offset) can be compared to determine a cross-track separation between the centerlines of the sensors. The separation values found block 504 may vary by region, e.g., due to skewing of the read/write head with respect to the written data pattern.

At block 506, TPI for the region is set. For example, if the track pitch for optimal reader sensor separation (e.g., reader separation is 15% of track pitch) falls within the range of optimal areal density, the laser power can be adjusted to match the track width/pitch corresponding to the optimal separation. Use this value as an initial optimization starting point. If the track pitch corresponding to optimal reader sensor separation is higher than the TPI capability of the drive, select the highest TPI value at the range of optimal ADC, ensuring that the selected TPI does not exceed the highest TPI supported by the servo-mechanical system. If the track pitch/width is below the optimal areal density range, select the lowest TPI value at the range of optimal areal density.

At block 508, bit length for the region is set. This can be performed, e.g., by starting with an initial BPI value well below the expected capability of the recording head. Over a number of iterations, the BPI is increased until BER exceeds a maximum limit, the BPI exceeds a threshold where it is likely sufficient to meet a required data capacity, and/or the BPI meets some other threshold. An appropriate BPI can be set 508 based on the results of this procedure. An optional optimization operation 510 can also be performed for the region. For example, for a number of test tracks, laser power can be increased by a fixed increment (e.g., 1%) and areal density re-characterized. If areal density is better at higher laser power, the setting of TPI in block 506 and/or BPI in block 508 is repeated using the higher laser power. If areal density is not better at higher laser power, laser power can be decreased by a fixed increment (e.g., 1%) and areal density is re-characterized. If areal density is better at a lower laser power, repeat the setting of TPI in block 506 and/or BPI in block 508 using the lower laser power.

After all regions have had TPI and BPI set, the loop completes via path 511. At this stage, a data storage capacity of the entire drive has been determined. If at this stage the drive the capacity exceeds the amount required for a product, the capacity can be adjusted to meet the required amount while improving other performance measures such as bit error rate and long term reliability (e.g., using lower laser power). For example, this adjustment 512 may involve reducing BPI across all regions (improving bit error rate) until capacity matches target requirement. Finally, the results are saved 514 in non-volatile storage and used by the system (e.g., servo controller, read/write channel) to govern how data is written to and read from the drive.

Figure 6:
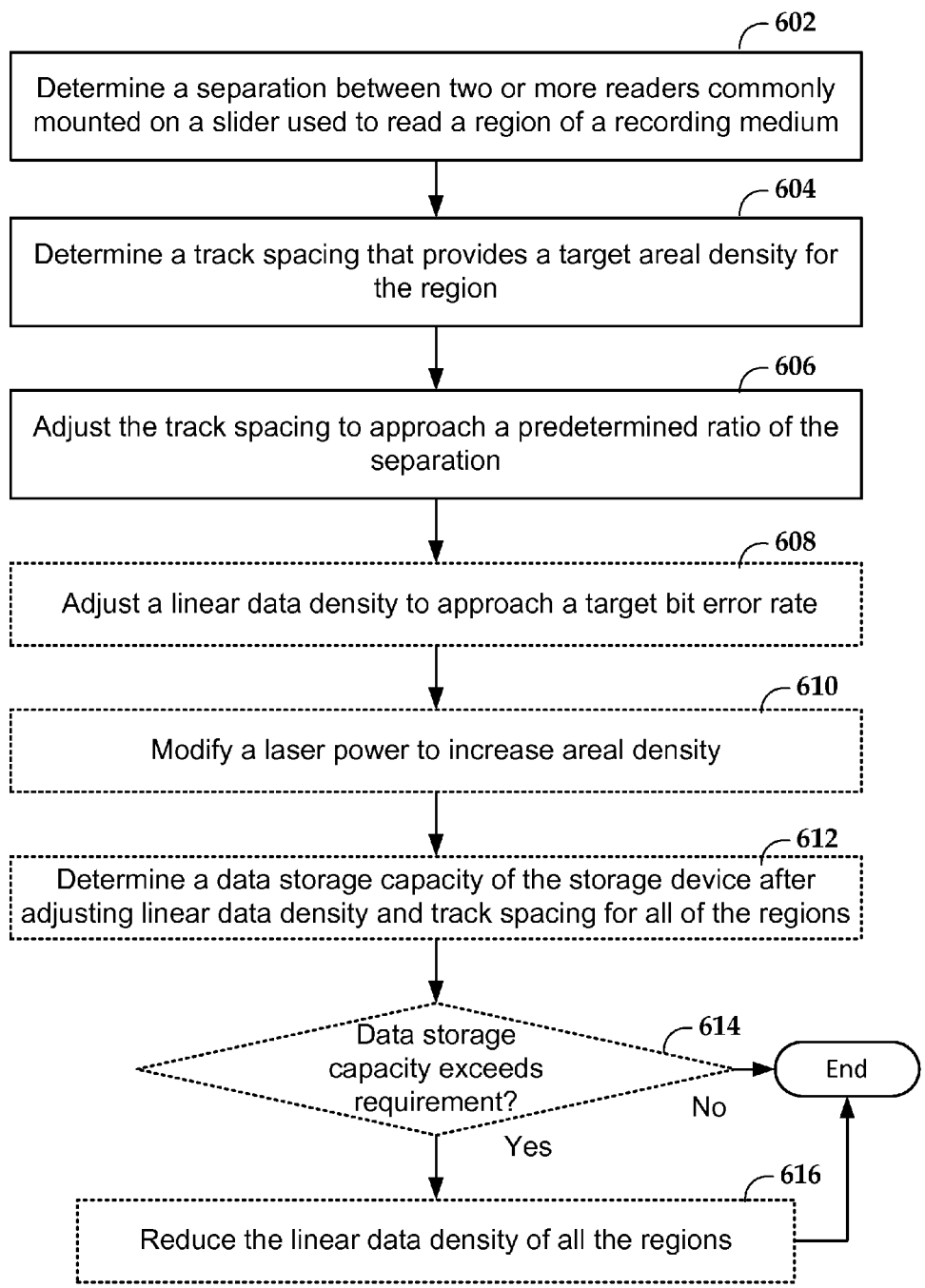

In reference now to FIG. 6, a flowchart illustrates a method according to an example embodiment. The method involves, for a region of a heat-assisted recording medium of a data storage device, determining 602 a separation between two or more readers commonly mounted on a slider used to read the recording medium. A track spacing is determined 604 that provides a target areal density for the region. The track spacing is adjusted 606 for the region to approach a predetermined ratio of the separation. The adjustment 606 may involve adjusting a laser power that affects at least a track width of recorded data, and as well as possibly involving adjusting servo settings that define center-to-center distances of the recorded tracks.

The method may optionally involve, after adjusting 606 the track spacing, adjusting 608 a linear data density for the region to approach a target bit error rate. The method may also optionally involve modifying 610 a laser power in increase areal density of the region. For example, the laser power may be increased and/or decreased for test tracks at the previously determined linear data density and track spacing and the adjusted value used if areal distance increases. The method may also optionally involve determining 612 a data storage capacity of the storage device after adjusting the linear data density and the track spacing for all of the plurality of regions. A test 614 is made as to whether the data storage capacity exceeds a requirement. If so, the linear data density of all the regions may be reduced 616.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   determining, for a region of a heat-assisted recording medium of a data storage device, a separation between two or more reader sensors commonly located on a read/write head used to read the recording medium;
   determining a track spacing that provides a target areal density for the region; and
   adjusting the track spacing for the region to approach a predetermined ratio of the separation.

2. The method of claim 1; further comprising, after adjusting the track spacing, adjusting energy applied to the recording medium during write operations via a laser to optimize a track width of written data.

3. The method of claim 2, wherein adjusting the energy comprises changing a laser power and a linear data density, and measuring an areal density associated with the changed laser power and the changed linear data density.

4. The method of claim 1, wherein, if the ratio of the separation is within a track spacing range of the region; adjusting the track spacing to correspond to the ratio of the separation; otherwise adjusting the track spacing to one of a higher or lower limit of the track spacing range.

5. The method of claim 4, wherein the lower limit is defined by a limit of a servo system that positions the read/write head, and wherein the higher limit is defined by the target areal density of the region.

6. The method of claim 1, wherein the separation and the track spacing are determined separately for each of a plurality of regions of the recording medium.

7. The method of claim 1, wherein adjusting the track spacing comprises adjusting a laser power that affects at least a track width of recorded data.

8. The method of claim 1, further comprising, after adjusting the track spacing, adjusting a linear data density of the region to approach a target bit error rate.

9. The method of claim 8, further comprising, after adjusting the linear data density, modifying a laser power to increase areal density of the region.

10. The method of claim 8, wherein the linear data density and the track spacing are determined separately for each of a plurality of regions of the recording medium.

11. The method of claim 10, further comprising:
determining a data storage capacity of the storage device after adjusting the linear data density and the track spacing for all of the plurality of regions; and
reducing the linear data density of all the regions if the data storage capacity exceeds a requirement.

12. An apparatus, comprising:
a read/write channel configured to read from and write to a heat-assisted recording medium via a multi-sensor read/write head; and
a controller coupled to the read/write channel and configured to:
determine, for a region of the recording medium, a separation between two or more readers commonly mounted on the read/write head;
determine a track spacing that provides a target areal density for the region; and
adjust the rack spacing for the region to approach a predetermined ratio of the separation.

13. The apparatus of claim 12, wherein the controller is further configured to, after adjusting the track spacing, adjust energy applied to the recording medium during write operations via a laser to optimize a track width of written data.

14. The apparatus of claim 12, wherein, if the ratio of the separation is within a track spacing range of the region, adjusting the track spacing to correspond to the ratio of the separation, otherwise adjusting the track spacing to one of a higher or lower limit of the track spacing range.

15. The apparatus of claim 14, wherein the lower limit is defined by a limit of a servo system that positions the read/write head, and wherein the higher limit is defined by the target areal density of the region.

16. The apparatus of claim 12, wherein adjusting the track spacing comprises adjusting a laser power that affects at least a track width of recorded data.

17. The apparatus of claim 12, wherein the controller is further configured to, after adjusting the track spacing:
adjust a linear data density of the region to approach a target bit error rate; and
after adjusting the linear data density, modify a laser power to increase areal density of the region.

18. The apparatus of claim 17, wherein the linear data density and the track spacing are determined separately for each of a plurality of regions of the recording medium, the controller being further configured to:
determine a data storage capacity of the storage device after adjusting the linear data density and the track spacing for all of the plurality of regions; and
reduce the linear data density of all the regions if the data storage capacity exceeds a requirement.

19. A method comprising:
determining, for a region of a heat-assisted recording medium of a data storage device, a separation between two or more reader sensors commonly located on a read/write head used to read the recording medium;
adjusting a track spacing for the region to approach a predetermined ratio of the separation;
adjusting a linear data density of the region to approach a target bit error rate after adjusting the track spacing; and
after adjusting the linear data density, modify a laser power to increase areal density of the region.

20. The method of claim 19, wherein, if the ratio of the separation is within a track spacing range of the region, adjusting the track spacing to correspond to the ratio of the separation, otherwise adjusting the track spacing to one of a higher or lower limit of the track spacing range.

* * * * *